United States Patent
Steuer et al.

(10) Patent No.: US 6,612,197 B2
(45) Date of Patent: Sep. 2, 2003

(54) AXLE SHIFT DEVICE FOR MULTI-SPEED HUBS FOR BICYCLES

(75) Inventors: Werner Steuer, Schweinfurt (DE); Georg Blaschke, Geldersheim (DE)

(73) Assignee: SRAM Deutschland GmbH (DE)

( * ) Notice: Subject to any disclaimer, the term of this patent is extended or adjusted under 35 U.S.C. 154(b) by 0 days.

(21) Appl. No.: 09/864,901

(22) Filed: May 24, 2001

(65) Prior Publication Data

US 2002/0004432 A1 Jan. 10, 2002

(30) Foreign Application Priority Data

May 27, 2000 (DE) .......................... 100 26 472

(51) Int. Cl.$^7$ .............................. B62K 23/06
(52) U.S. Cl. ................ 74/473.14; 74/523; 280/260
(58) Field of Search ................ 74/473.14, 523; 280/260

(56) References Cited

U.S. PATENT DOCUMENTS

| | | | |
|---|---|---|---|
| 4,651,853 A | 3/1987 | Bergles | 192/6 |
| 4,828,535 A | 5/1989 | Sinoquet | 474/80 |
| 5,182,962 A | * 2/1993 | Leiter | 74/473 R |
| 5,301,571 A | * 4/1994 | Arrivabene | 74/594.3 |
| D351,776 S | 10/1994 | Schuchard et al. | D8/303 |
| 5,469,755 A | 11/1995 | Steuer et al. | 74/371 |
| 5,588,925 A | 12/1996 | Arbeiter et al. | 474/81 |
| 5,605,514 A | * 2/1997 | Driver | 74/470 |
| 5,806,372 A | * 9/1998 | Campagnolo | 74/473.14 |
| 6,134,980 A | * 10/2000 | Uchiyama | 74/474.13 |

FOREIGN PATENT DOCUMENTS

| | | | |
|---|---|---|---|
| DE | 436419 | 11/1926 | |
| DE | 814 982 | 9/1951 | |
| DE | 27 23 869 | 9/1985 | .......... B62M/25/02 |
| DE | 34 40 069 | 12/1993 | .......... B62M/11/16 |
| DE | 44 20 125 | 1/1996 | .......... B62M/25/04 |
| DE | 42 44 679 | 2/1996 | .......... B62M/25/02 |
| EP | 0 272 947 | 6/1988 | .......... B62M/25/04 |
| EP | 0 575 560 | 12/1993 | .......... B62M/25/04 |
| EP | 0 671 315 | 9/1995 | .......... B62K/23/04 |
| EP | 0 700 827 | 3/1996 | .......... B62M/25/04 |
| GB | 1 582 796 | 5/1977 | ............. F16H/5/10 |

\* cited by examiner

*Primary Examiner*—William C Joyce
*Assistant Examiner*—Timothy McAnulty
(74) *Attorney, Agent, or Firm*—Milan Milosevic; Lisa Wunderlich

(57) ABSTRACT

An axle shift device for transmitting control movements from a remote control to a multi-speed hub in a cycle includes a housing and a pivoted lever arranged in the housing. The axle shift device is arranged on a hub axle of the multi-speed hub. This pivoted lever is in form-locking effective connection with a force transmission element which has a head and is preferably actuated in tension against a return spring. A slide arranged in the housing can move the pivoted lever out of form-locking engagement with the head of the force transmission element, thereby allowing the axle shift device to be removed from the hub axle in a simple manner without the aid of tools.

17 Claims, 3 Drawing Sheets

AXLE SHIFT DEVICE FOR MULTI-SPEED HUBS FOR BICYCLES

BACKGROUND OF THE INVENTION

1. Field of the Invention

The present invention relates to a shift actuator for multi-speed hubs on bicycles.

2. Description of the Related Art

A device for changing the transmission ratio of bicycles that has a pull rod passing through a hollow rear-wheel axle and a bell-crank lever that acts on the pull rod is disclosed in German Patent No. 436 419. The bell-crank lever is mounted in a carrier piece screwed onto the axle. A bearing eye of the bell-crank lever which surrounds a journal has a slot at the side to allow the bell-crank lever to be slid off the journal without releasing the journal.

Accordingly, this reference discloses a housing that is screwed onto the hub axle with a journal on which the bell-crank lever is mounted. The bell-crank lever is held in position on the journal by the forces that occur during actuation. Twist fitting without a tool is possible here as long as the bell-crank lever has been released from its actuating pull mechanism. After being unhooked from the linkage, the bell-crank lever is rotated out of the housing. Refitting is presumably more difficult inasmuch as the bell-crank lever has to be hooked back into the linkage.

SUMMARY OF THE INVENTION

The present invention is an axle shift device which comprises a housing with a pivoted lever arranged therein such that the pivoted lever is rotatable about a pivoting axis and can be displaced manually from the outside via a slide. The displacement via the slide enables the axle shift device to be selectively fitted on and removed from the hub axle for establishing and canceling a form-locking engagement with a force transmission element that is arranged in a central hole in a hub axle with the gear of the multi-speed hub for the purpose of changing the gear ratios.

The pivoted lever is connected to a remote control by a transmission component in the form of a wire. The remote control may be operated by the cyclist. The pivoted lever forms a structural unit with the transmission component that can be mounted on the cycle in a simple manner both when initially equipping the cycle and when repairing it. The structural unit may be preadjusted so that it is possible to prepare structural units for different types of hubs for mounting on the cycle without the requiring additional quality controls on the assembly line.

The force transmission element has a head and the pivot lever has a forked end which reaches the head. When the pivoted lever is actuated, the forked end pulls the head of the actuating element out of the multi-speed hub. A return spring ensures that when shifting back via the remote control, the force transmission element and the pivoted lever are pulled back into their original position. The slide in the housing of the axle shift device allows the axle shift device to be removed from the hub in any gear position of the axle shift device by releasing the form-locking connection between the forked end and the head of the force transmission device. The axle shift device may consequently be refitted if the slide is held in the disengaged position. When the slide is actuated, the forked end is preferably displaced parallel to the pivoting axis of the pivoted lever, with the result that the forked end moves away from the head and the form-locking engagement is cancelled. Once the form-locking engagement is cancelled, the axle shift device may be pulled off the hub axle. The technical solution just described should be regarded as one of several that are self-evidently possible structurally when it comes to the cancellation of the form-locking engagement. For example, the actuation of the slide may also be used to displace the pivoting axis in a direction perpendicular to the above-described direction of displacement, this likewise having the effect that the forked end is released from the head. It is furthermore conceivable for the forked end of the pivoted lever to be rotated or pivoted out of its form-locking engagement with the head or pushed out in some other way defined by one of the six degrees of freedom.

The axle shift device may optionally be arranged for holding the pivoted lever fast in the decoupling position after the latter has been decoupled from the force transmission element. In this optional embodiment, the axle shift device may always be fitted, both initially and in the case of a repair, merely by moving the slide into the decoupling position. It has been found that the best way of removing the axle shift device from the hub axle is for the force transmission element to be in a particular decoupling position, namely in the force-free state, relative to the multi-speed hub. In this state, the form-locking engagement between the forked end and the head may be made force-free by slackening the transmission component (i.e., in the form of a wire) such that it requires a minimum of manual actuating force to actuate the slide and thus decouple the pivoted lever. In this case, it is advisable to have a securing element to hold the pivoted lever in the position assumed during the decoupling process. The securing element may comprise a detent element that is arranged in the housing and acts on the slide. The release of the slide can be accomplished either by a return spring or by an additional manual actuating movement on the slide to bring about form-locking engagement once the axle shift device has been mounted on the hub axle.

It has been found expedient to incorporate a certain self-locking into the mountings of the slide to ensure that there is no feeding back of the shifting forces from the gear of the multi-speed hub into the coupling and decoupling process in the direction of the remote control. The shifting forces must thus pass from the remote control to the gear of the multi-speed hub, the forces or reaction forces that arise in the gear not being transmitted back in the opposite direction to the remote control via the transmission component in the form of a wire.

While previously it has been assumed that the axle shift device was held in position by the form-locking engagement of the pivoted lever with the head of the force transmission element, it is also possible to operate a gear of a multi-speed hub by a force transmission element moved by pressure by a pivoted lever. In this case, the slide activates or deactivates locking between the housing and the hub axle, this locking serving to secure the axle shift device on the hub axle.

Therefore, an object of the present invention is to provide an axle shift device that is removable from a hub axle of a multi-speed hub without tools. The axle shift device is connectable to a frame of a cycle as a structural unit in a simple manner both for initial fitting and for repair. A remote control for the axle shift device is connected via a transmission component in the form of a wire, i.e., a Bowden cable.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
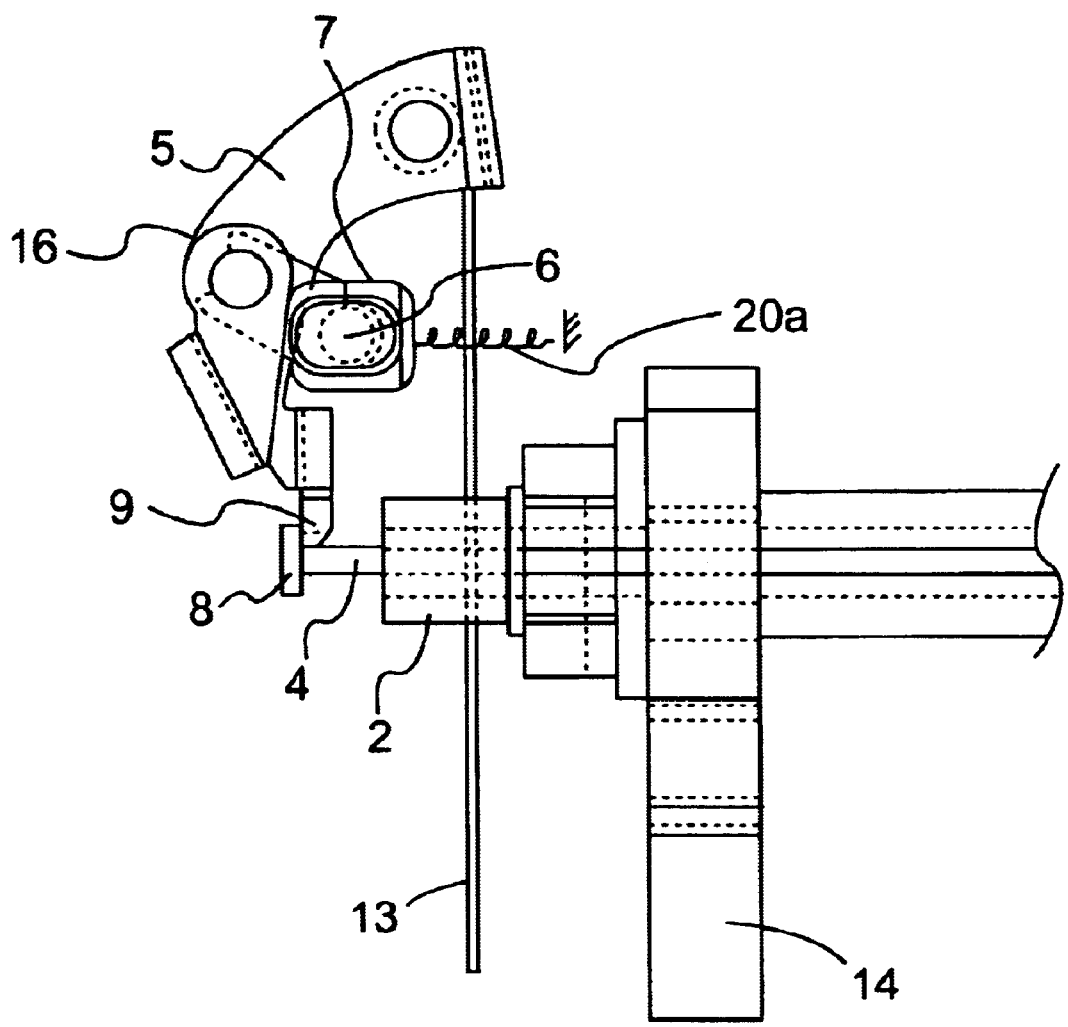
FIG. 1 is a partial plan view of a hub axle in a bicycle frame with a force transmission element and a pivoted lever which includes a forked end engaging the force transmission element.
Figure 2:
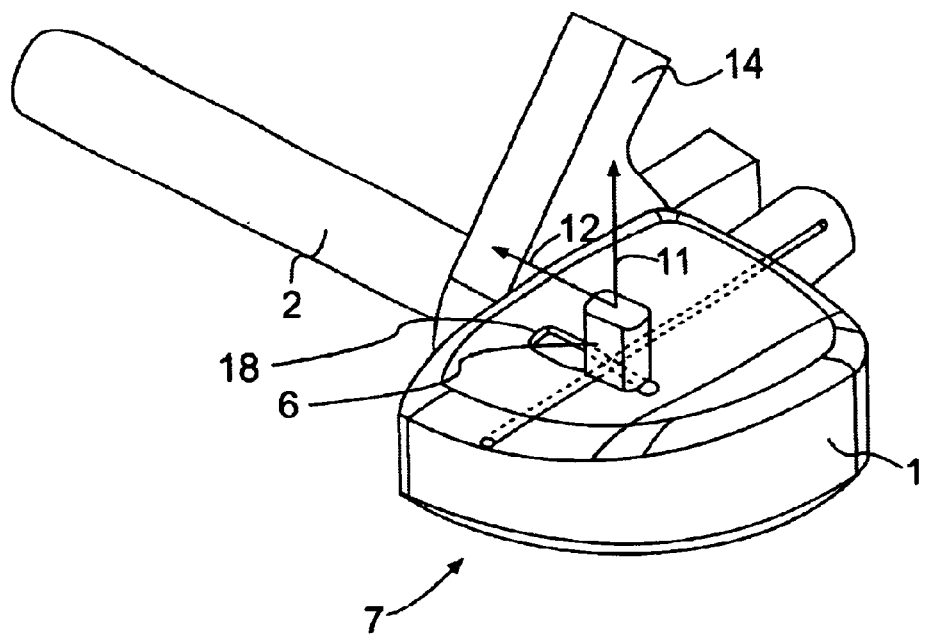
FIG. 2 is a perspective view showing the axle shift device of FIG. 1 with a housing and a slide for pushing the axle shift device out of its position of engagement with the force transmission element.
Figure 3:
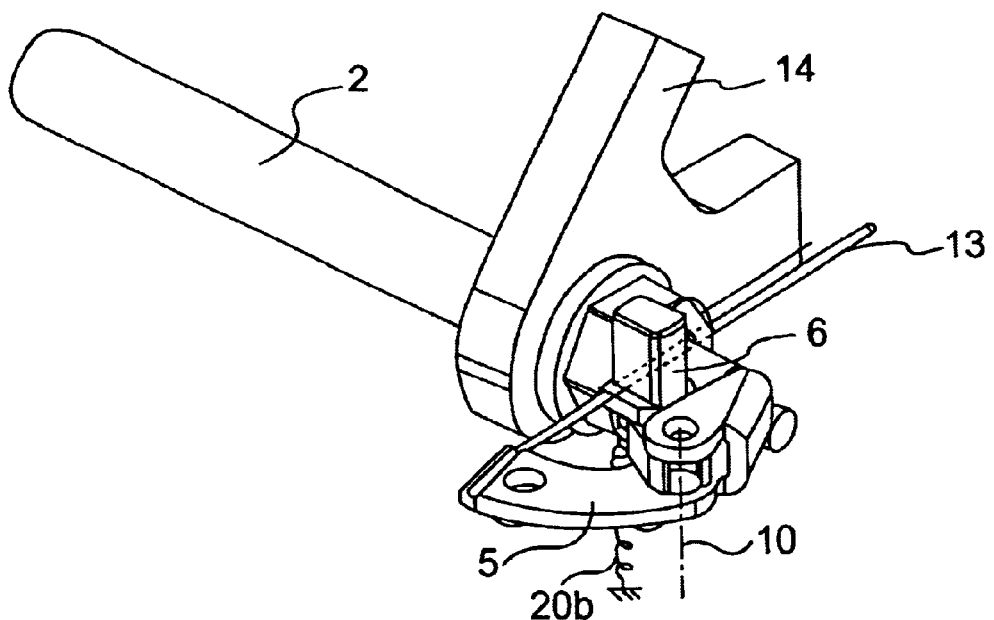
FIG. 3 is a perspective view of the pivoted lever and the slide of FIG. 1 with actuation of the slide in the direction of a pivoting axis for the pivoted lever.

An axle shift device 7 according to an embodiment of the present invention is shown in FIGS. 1–3. A pivoted lever 5 is arranged in a housing 1 of the axle shift device 7 and is mounted on a pivoting axis 10 which is also arranged in the housing 1. One end of the pivoted lever 5 is connected to a remote control by a transmission component 13, i.e., a wire or a Bowden cable. The other end of the pivoted lever 5 comprises a forked end 9 which enters into a form-locking connection with a head 8 of a force transmission element 4. The force transmission element 4 is mounted in a central hole 3 of a hub axle 2 and is connected directly to a gear of a multi-speed hub for changing the gear ratios. The force transmission element 4 is pulled by a return spring (not shown) into an end position from which the individual gear ratios can be successively selected by the remote control. The pivoted lever 5 has a forked end 9 that reaches behind the head 8 and thus establishes a form-locking connection between the pivoted lever 5 and the gear of the multi-speed hub.

A slide 6 is mounted in the housing 1 and may be actuated in a first direction of displacement 11 that is parallel to the pivoting axis 10. The housing 1, the pivoted lever 5 and the slide 6 are the essential components of the axle shift device 7, which is arranged on the hub axle 2 such that the axle shift device may be selectively fitted onto and removed therefrom. The hub axle 2 should be regarded as an integral part of the multi-speed hub, which has a gear connected to the axle shift device 7 via the force transmission element 4. The hub axle 2 is firmly connected to a frame 14 of the bicycle. The connection between the hub axle 2 and the frame 14 is unaffected by the fitting and removal of the axle shift device 7 to and from the hub axle 2.

The pivoted lever 5 is also displaceable via the slide 6 in a second direction of displacement 12 which is perpendicular to the first direction of displacement 11 to cancel the form locking connection between the forked end 9 and the head 8. Of course, other relative directions of displacement and pivoting directions are conceivable for achieving the functions of the above described first and second displacement directions. These are all structurally possible and to be regarded as equivalent designs and no further special mention is therefore made of them here.

Figure 4:
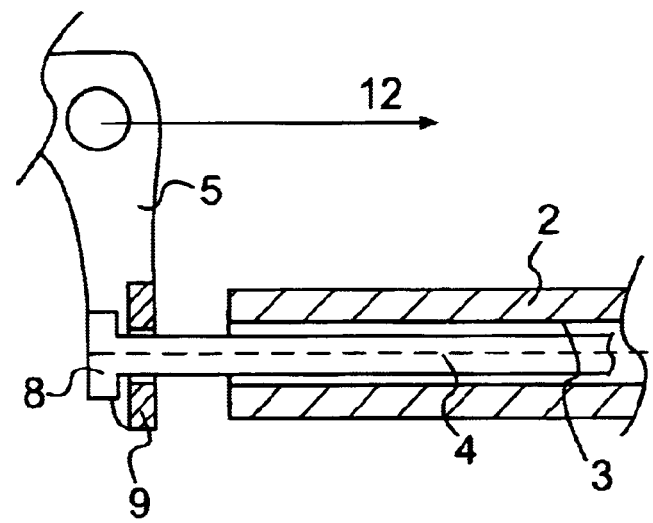
FIG. 4 is a sectional view along the axis of the hub axle with a central hole and the force transmission element arranged therein, with a head that is in form-locking engagement with the forked end of the pivoted lever.
Figure 5:
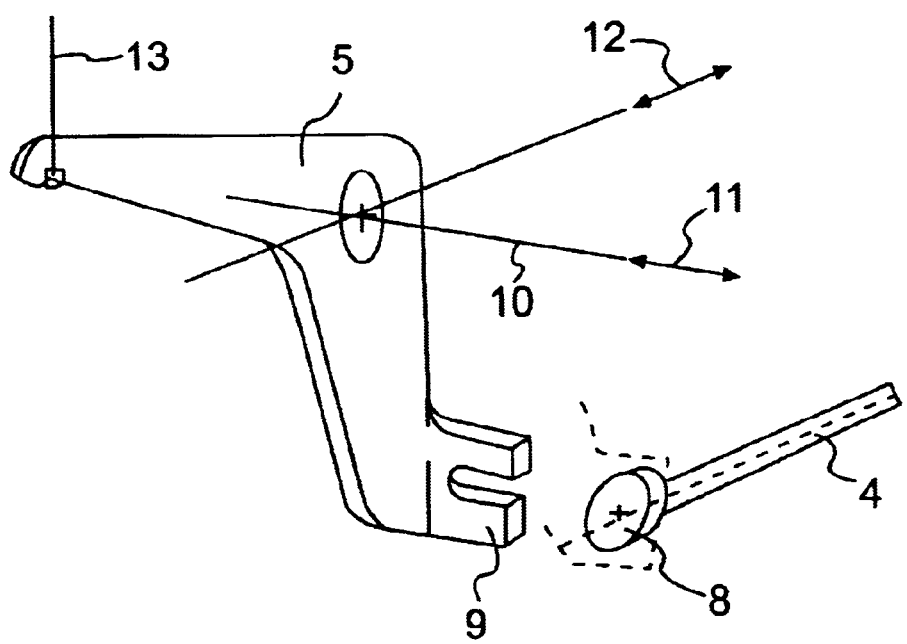
FIG. 5 shows the force transmission element with the pivoted lever, which can be displaced by the slide in a plurality of directions of displacement in the housing.

The slide 6 is first moved in the second direction of displacement 12 (see FIGS. 4 and 5) to cancel the form-locking connection between the forked end 9 and the head 8 of the force transmission element 4. Then the slide is 6 is moved in the first direction of displacement 11 to movement pivoted lever 8 from the force transmission element 4. The slide 6 moves in a guide 18 in the housing 1 of the axle shift device 7. The guide 18 may be designed as a detent such that the slide 6 is held in the decoupled position. For this purpose, the slide 6 may have a lip which can be held by the guide 18 when the slide has been moved to the decoupling position. Springs or other resilient members 20a, 20b may be arranged for urging the slide away from the decoupling position. These resilient members 20a, 20b are shown schematically in FIGS. 1 and 3. The slide 6 is connected to the pivoted lever 5 via a force-locked connection. As shown in FIG. 1, this force-locked connection may comprise a connection via a forked end 16 of the slide 6.

It has been found that it is possible to create an axle shift device 7 that is fixed on the hub axle 2 by a slide 6 by locking as long as the pivoted lever 5 is connected to the gear of the multi-speed hub by a pressure-force transmission element 4. In this case, the positive locking between the head 8 and the forked end 9 of the pivoted lever 5 no longer holds the housing 1 and thus the axle shift device 7 fast on the hub axle 2, for which reason the housing 1 must be secured on the end of the hub axle 2 by means of the locking. In this case there is form locking between the pivoted lever 5 and the head 8 of the force transmission element 4 only inasmuch as the pivoted lever 5 exerts pressure on the pressure-force transmission element in the case of a shift.

The present invention, a slide 6 arranged in the housing 1 is actuatable for moving the pivoted lever 5 out of form-locking engagement with the head 8 of the force transmission element 4, thereby allowing the axle shift device 7 to be removed from the hub axle 2 in a simple manner without the aid of tools.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. An axle shift device for arrangement on a hub axle of a multi-speed hub on a bicycle, the multi-speed hub having a rod-shaped force transmission arranged in a central hole cavity of the hub axle, said axle shift device comprising:

a housing;

a pivoted lever having at least two ends pivotally connected in said housing for pivoting about a pivoting axis, one of said at least two ends of said pivoted lever being connectable to a remote control and another end of said at least two ends of said pivoted lever being connectable via a forming locking connection to the rod-shaped force transmission element of the multi-speed hub for actuating said rod-shaped force transmission element; and a slide operatively arranged for controlling a decoupling of a connection between said pivoted lever and the rod-shaped force transmission element such that said axle shift device is removable from the hub axle as a fully assembled integral unit.

2. The axle shift device of claim 1, wherein said another end of said at least two ends of said pivoted lever comprises a forked end connectable via a form-locking connection to the rod-shaped force transmission element.

3. The axle shift device of claim 1, wherein the form-locking connection of said pivoted lever to the rod-shaped force transmission element is decoupleable via a movement of said another end of said pivoted lever in a direction perpendicular to the hub axle.

4. The axle shift device of claim 1, wherein the slide is operatively arranged for receiving a manual action for controlling the decoupling of the connection between pivoted lever and the rod-shaped force transmission element.

5. The axle shift device of claim 1, wherein said slide is movable in a direction perpendicular to the hub axle for decoupling said pivoted lever from said rod-shaped force transmission element.

6. The axle shift device of claim 1, wherein said another end of said at least two ends of said pivoted lever comprises a forked end connectable via the form-locking connection to the rod-shaped force transmission element, and said pivoted lever is rotatable about a direction of displacement perpendicular to the hub axle as said forked end of said pivoted lever is decoupled.

7. The axle shift device of claim 1, wherein said another end of said at least two ends of said pivoted lever comprises a forked end connectable via a form-locking connection to the rod-shaped force transmission element, and said axle shift device comprises a guide arranged for guiding a movement of said pivoted lever along a straight line perpendicular to said hub axle to a decoupling position for decoupling said forked end of said pivoted lever from the force transmission element.

8. The axle shift device of claim 7, wherein said slide is operatively arranged for holding said pivoted lever in the decoupling position.

9. The axle shift device of claim 7, wherein the pivoted lever is movable to said decoupling position only in decoupling positions of the force transmission element.

10. The axle shift device of claim 9, wherein said decoupling positions of said force transmission element correspond to a force-free state of the force transmission element.

11. The axle shift device of claim 9, wherein said slide is operatively arranged for holding and securing said pivoted lever in the decoupling position.

12. The axle shift device of claim 1, wherein said slide is operatively arranged for fixing the axial position of said axle shift device on said hub axle.

13. The axle shift device of claim 1, wherein said pivoted lever is movable against a spring force for decoupling from the force transmission element.

14. The axle shift device of claim 1, wherein said slide interacts with said pivoted lever via a form-locking connection during movement of said pivoted lever for one of coupling and decoupling the connection between said pivoted lever and the force transmission element.

15. The axle shift device of claim 1, wherein a mounting of said slide on said axle shift device exhibits a self-locking characteristic so that shifting forces received via the remote control pass only to the multi-speed hub, thereby avoiding feedback of the shifting forces into the coupling and decoupling.

16. The axle shift device of claim 1, wherein said slide is operable for locking said axle shift device on the hub axle.

17. The axle shift device of claim 1, further comprising a return spring arranged for urging said slide from said decoupling position.

* * * * *